United States Patent Office 3,507,590
Patented Apr. 21, 1970

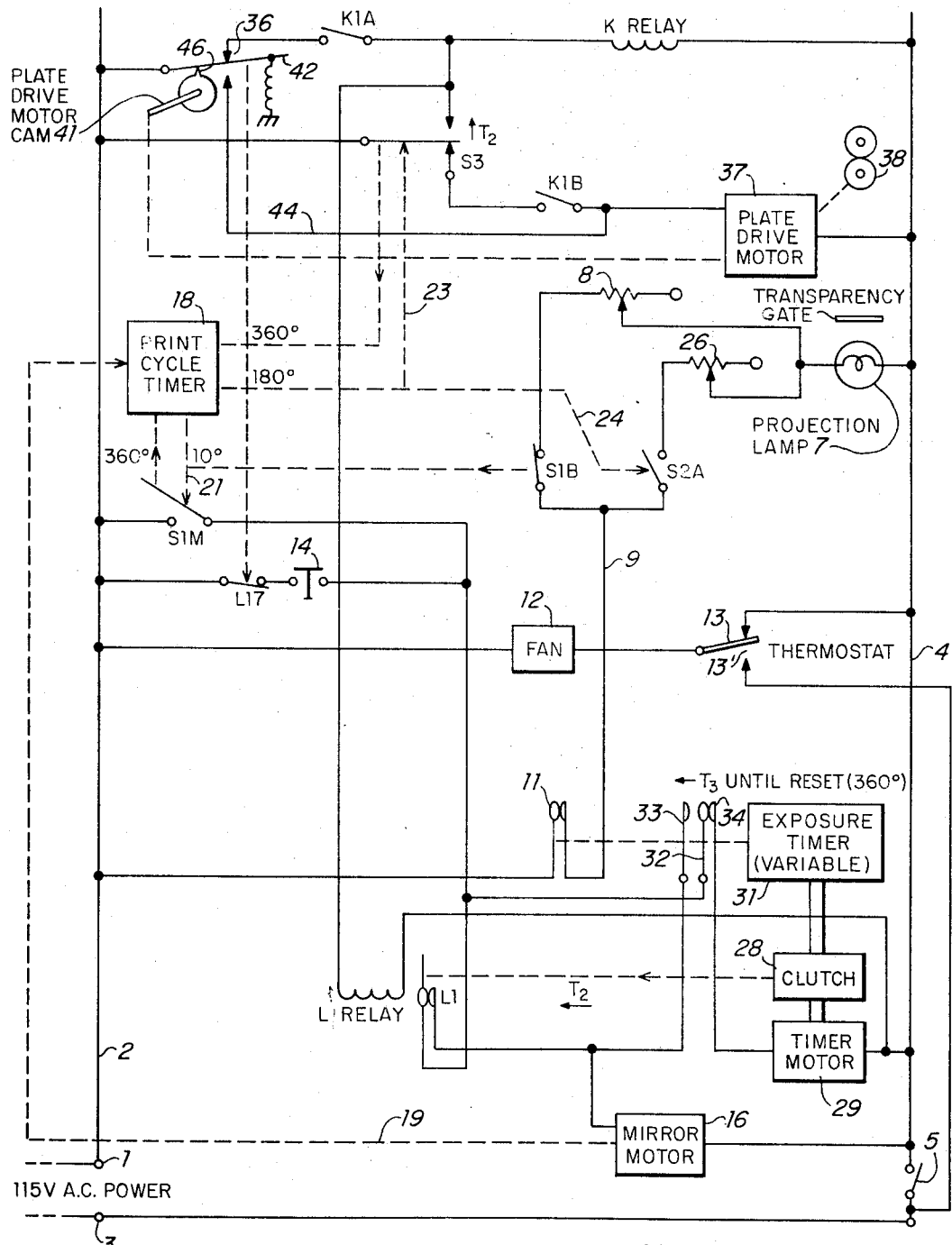

3,507,590
READER PRINTER
Americo J. Cerasani, Rochester, N.Y., assignor to Itek Corporation, Lexington, Mass., a corporation of Delaware
Filed Mar. 8, 1967, Ser. No. 623,795
Int. Cl. G03b 27/76; G05d 25/00
U.S. Cl. 355—68                                   2 Claims

ABSTRACT OF THE DISCLOSURE

An electrical control circuit is utilized to control the power input applied to a projection lamp which illuminates the film gate of a reader printer, the control circuit causing the projection lamp to be highly illuminated during the printing interval and being illuminated to a much lesser degree during viewing intervals. Since the viewing intervals are generally much longer than the printing intervals heat dissipation problems are eliminated.

---

This disclosure relates to an improved reader printer. U.S. Patent 3,240,115 of D. H. Robbins et al., incorporated herein by reference, discloses a prior art reader printer which includes a viewing screen, a printing platen, a projection system, and a film transparency gate. In the viewing mode an image of the transparency in the film gate is projected at the viewing screen. A movable mirror is provided for optically decoupling the transparency gate from the viewing screen and for optically coupling the gate to the printing platen in the printing mode. After exposure of the photosensitive paper on the platen, the transparency gate is again optically coupled to the viewing screen and is decoupled from the printing platen. Following exposure, the exposed media is transported off of the printing platen and into a chemical processor while unexposed media is moved up upon the printing platen. FIGURE 10 of this patent illustrates the control circuitry of the prior art reader printer which includes timing devices comprising cams and microswitches which control various switching functions during the cycle.

BACKGROUND OF THE INVENTION

In the reader printer disclosed in the aforesaid patent, the exposure interval is fixed and total exposure is changed by adjusting the current passed through the exposure lamp and hence the illumination intensity during the exposure interval. The passage of different currents through the projection lamp to produce various total exposures cause changes in the color temperature and spectral frequency distribution of the lamp which may cause differing results in the print quality. The lamp intensity is increased during the viewing intervals to provide adequate viewing illumination, while the lamp intensity is decreased during the exposure of highly sensitive silver halide paper during printing. However, the photosensitive paper utilized in the modified reader printer requires a larger projection lamp to produce high intensity illumination during printing. To alleviate heat dissipation problems during the viewing intervals, which are generally longer than the printing intervals, the light intensity should be decreased to a level which is adequate for viewing.

SUMMARY OF THE INVENTION

In accordance with the present invention, a larger projection lamp having a predetermined voltage rating is operated at this voltage only during the printing intervals, while the lamp is operated at a lower voltage during the viewing intervals, which are generally longer than the printing intervals, and accordingly the heat dissipation requirements of the cooling system are not excessive. Since the color temperature of the lamp is predetermined and constant while it is operated at the rated lamp voltage during viewing, variations in image quality will not occur, in contrast with the aforesaid prior art system which causes the projection lamp to be illuminated at varying intensities during the printing intervals. The exposure timer of the present invention may be accurately varied by virtue of an electromechanical cam operated timer functioning in a novel control circuit. An electrical interlock is also provided for preventing the operator from prematurely initiating a print cycle before the exposed media has been transported off of the printing platen and fresh plate material is in position at the platen.

Further objects, features, and advantages of the present invention will become apparent as the sole figure, together with the aforesaid patent, is studied in connection with the specific description of an embodiment of the invention.

DETAILED DESCRIPTION

Referring now to the figure, AC power terminal 1 is connected to conductor 2 while power terminal 3 is connected to conductor 4 through power switch 5. Projection lamp 7 is illuminated by virtue of a closed circuit through rheostat 8, switch S1B, conductor 9 and closed contacts 11. Rheostat 8 is adjusted to apply about 90 volts across projection lamp 7 which results in a level of viewing illumination which is adequate for viewing purposes. Fan 12 is energized through thermostat contact 13 to cool the viewing gate.

Now let it be assumed that the operator desires to reproduce the contents of a viewed negative transparency. Pushbutton 14 is actuated at time T–1 to energize mirror motor 16 via closed contact 17 and closed contacts L1. The print cycle timer 18 commences to be driven by mirror motor 16 via mechanical link 19. The print cycle timer 18 includes a cam for sequentially operating various microswitches in different intervals of the printing cycle. Just after mirror motor 16 becomes energized and the print cycle timer cam rotates about 10°, Contact S1A is closed via mechanical link 21 to thereby continue to energize mirror motor 16 through Contacts L1 after pushbbutton 14 is released by the operator. Mechanical link 21 also opens contact S1B to de-energize projection lamp 7 at this time. Mirror motor 16 drives the mirror shown in FIGURE 2 of the aforesaid patent into the upper print position. About when the print cycle timer cam reaches the 180° position, the armature of S3 is raised via link 23 to cause the energization of the L relay which in turn opens contact L1 to de-energize mirror motor 16. The mirror is now in the print position and switch S2A is closed by link 24 and projection lamp 7 is energized through rheostat 26 and closed contacts 11. Rheostat 26 is adjusted so that full or almost full line voltage is impressed across projection lamp 7 so that the lamp is operated at the voltage for which it was designed and to produce the known proper spectral distribution in accordance with the lamp specification. Since this condition occurs for short intervals, the fan may be relatively small and heating becomes less of a problem. This re-energization of lamp 7 and the operation of the L relay together with the de-energization of mirror motor 16 occurs at time T–2 which defines the beginning of the exposure interval. At this time, clutch 28 is actuated by the L relay and timer motor 29 which has been operating since time T–1 commences to turn the cam of exposure timer 31. Since projection lamp 7 is turned on at time T–2 and the mirror motor is in the print position exposure of the plate material occurs starting at time T–2. After the exposure timer cam turns through a predetermined angle which defines the exposure interval (and which may be varied), armature 32 is actuated to the left to close contacts 33 and to open contacts 34 while contacts 11 are opened. The opening of contacts 11 breaks the lamp energization circuit which includes conductor 9, closed contacts S2A and rheostat 26 thereby to define the end of the exposure interval at time T-3. The closing of contacts 33 at T-3 causes the re-energization of mirror motor 16 which now drives the mirror back to the viewing position illustrated by the dotted rectangular 46 in FIGURE 2 of the aforesaid patent.

Upon the initiation of the exposure interval at time T-2, the K relay becomes energized when the armature of S-3 is raised, which in turn causes contact K1A to be closed to hold the relay energized via closed contacts 36. Contact K1B also closes at this time to set the stage for the later energization of the plate drive motor 37.

The re-energization of mirror motor 16 again drives the print cycle timer cam 33 to the "home" or the 360° position. The arrival of the print cycle timer cam at the home position causes the armature of S-3 to be lowered thereby to energize plate drive motor 37 via closed contact K1B and S-3. Drive rollers 38 are now actuated to drive the exposed plate material to the processing station. Plate drive motor cam 41 which is mechanically driven by plate drive motor 37 commences to rotate thereby to cause the spring loaded armature 42 to break contact 36 which causes the de-energization of the K relay and which causes contacts K1B and K1A to reopen. The energization of plate drive motor 37 is now maintained through conductor 44. Cam 41 continues to be driven by plate drive motor 37 until spring loaded armature 42 is again raised by cam projection 46 which de-energizes plate drive motor 37. Upon the energization of plate drive motor 37 at the "home" position of the print cycle timer, it is important that switch 17 is opened so that the operator cannot commence the printing cycle to double expose the photosensitive media by pressing pushbutton 14. At the "home" position of the print cycle timer, S1A is opened to de-energize mirror motor 16, which has returned the mirror to the viewing position. Contacts 11 are again closed and switch S1B is closed, both by the print cycle timer, to re-energize projection lamp 7 in the lower voltage viewing mode. Contacts 33 are now opened while contacts 34 are closed to set the stage for a subsequent printing cycle. Thermostat 13 will keep fan 12 energized through contacts 13 after switch 5 is opened as long as elevated temperatures exist within the machine.

Obviously many modifications and variations of the present invention are possible in the light of the above teachings. It is therefore to be understood, that within the scope of the appended claims, the invention may be practiced otherwise than as specifically described.

I claim:
1. In a reader printer having means for illuminating a transparency gate during a viewing interval and a printing interval:
(a) A projection lamp having a first and second terminal, a first impedance device having a first and second terminal, a second impedance device having a first and second impedance terminal, the impedance of said second impedance device being less than the impedance of said first impedance device;
(b) a control switch having a first terminal coupled to a power source and having a second terminal coupled to the first terminal of said first impedance device through a viewing illumination switch and connected to the first terminal of said second impedance device through a printing illumination switch;
(c) means for coupling the second terminals of said first and second impedance devices to the first terminal of said projection lamp;
(d) means for coupling the second terminal of said projection lamp to said power source;
(e) means for closing said control switch and said viewing illumination switch during said viewing interval;
(f) and means for closing said printing illumination switch at the beginning of said printing interval.

2. The combination as set forth in claim 1 further including means for opening said control switch at the end of said printing interval.

References Cited

UNITED STATES PATENTS

| | | | |
|---|---|---|---|
| 2,890,618 | 6/1959 | Johnson | 95—31 |
| 3,240,115 | 3/1966 | Robbins et al. | 355—28 |
| 3,354,776 | 11/1967 | Smitzer et al. | 353—76 |

JOHN M. HORAN, Primary Examiner

R. A. WINTERCORN, Assistant Examiner

U.S. Cl. X.R.

353—71, 77; 355—44